(12) United States Patent
Wistrand et al.

(10) Patent No.: US 9,504,199 B2
(45) Date of Patent: Nov. 29, 2016

(54) AGRICULTURAL IMPLEMENT HAVING A FEED DEVICE FOR AIRFLOW-BASED FEEDING OF A GRANULAR OR POWDER MATERIAL

(71) Applicant: Vaderstad Holding AB, Vaderstad (SE)

(72) Inventors: Ulf Wistrand, Skoldinge (SE); Jorgen Fransson, Vaderstad (SE)

(73) Assignee: Vaderstad Holding AB, Vaderstad (SE)

( * ) Notice: Subject to any disclaimer, the term of this patent is extended or adjusted under 35 U.S.C. 154(b) by 37 days.

(21) Appl. No.: 14/382,099

(22) PCT Filed: Feb. 28, 2013

(86) PCT No.: PCT/SE2013/050184
§ 371 (c)(1),
(2) Date: Aug. 29, 2014

(87) PCT Pub. No.: WO2013/130005
PCT Pub. Date: Sep. 6, 2013

(65) Prior Publication Data
US 2015/0030420 A1     Jan. 29, 2015

(30) Foreign Application Priority Data
Mar. 1, 2012   (SE) ...................................... 1250198

(51) Int. Cl.
*A01C 7/20*      (2006.01)
*A01C 7/08*      (2006.01)
*A01C 15/04*     (2006.01)
*A01C 15/00*     (2006.01)

(52) U.S. Cl.
CPC .................. *A01C 7/20* (2013.01); *A01C 7/081* (2013.01); *A01C 15/006* (2013.01); *A01C 15/04* (2013.01)

(58) Field of Classification Search
CPC .......... A01C 7/20; A01C 7/00; A01C 7/081; A01C 7/08; A01C 15/006; A01C 15/005; A01C 15/00; A01C 15/04
See application file for complete search history.

(56) References Cited

U.S. PATENT DOCUMENTS

| | | |
|---|---|---|
| 3,762,603 A | 10/1973 | Bauman et al. |
| 3,885,704 A | 5/1975 | Lienemann et al. |
| 4,529,104 A | 7/1985 | Tyler |
| 4,758,119 A | 7/1988 | Frase et al. |

(Continued)

FOREIGN PATENT DOCUMENTS

| | | |
|---|---|---|
| DE | 32 08 555 | 11/1983 |
| DE | 10 2009 014 170 A1 | 9/2010 |

(Continued)

OTHER PUBLICATIONS

Extended European Search Report issued Oct. 16, 2015 in Patent Application No. 13755232.9.

(Continued)

*Primary Examiner* — Christopher J Novosad
(74) *Attorney, Agent, or Firm* — Oblon, McClelland, Maier & Neustadt, L.L.P.

(57) ABSTRACT

An agricultural implement including at least one container for granular or powder material and a feed device for airflow-based feeding of the granular or powder material. The feed device includes a fan including an impeller accommodated in a fan housing. At least one wall portion of the fan housing is integrated with a wall portion of the container.

11 Claims, 4 Drawing Sheets

(56) References Cited

U.S. PATENT DOCUMENTS 7,802,617 B2 9/2010 Hwang et al.
8,206,099 B2 6/2012 Tsai et al.

FOREIGN PATENT DOCUMENTS

| EP | 0 244 712 | 11/1987 |
| EP | 0 781 504 | 7/1997 |
| FR | 2.138.893 A1 | 1/1973 |
| WO | 03 103369 | 12/2003 |

OTHER PUBLICATIONS

International Preliminary Report on Patentability issued Sep. 12, 2014 in PCT/SE 2013/050184.
Written Opinion of the International Searching Authority Issued Jun. 11, 2013 in PCT/SE13/050184 Filed Feb. 28, 2013.
International Search Report Issued Jun. 11, 2013 in PCT/SE13/050184 Filed Feb. 28, 2013.

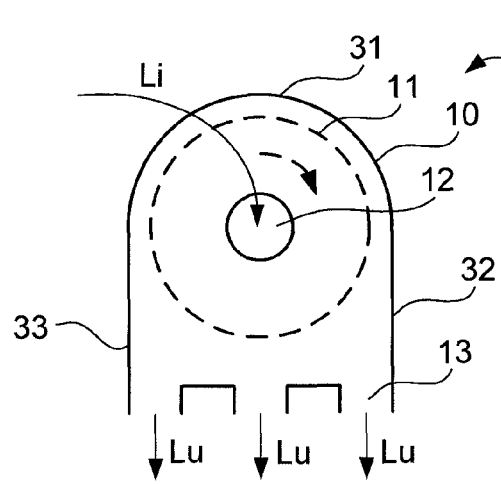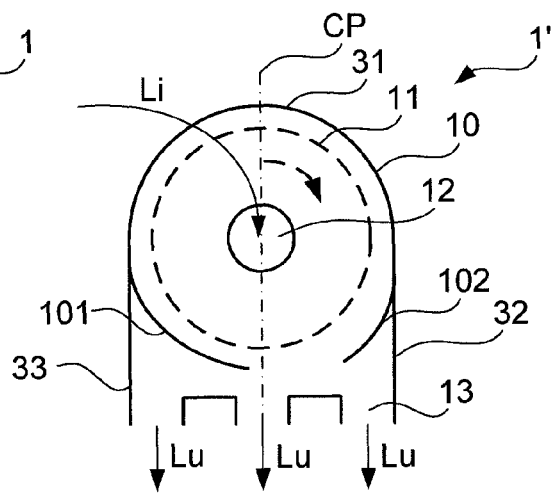
Fig 4a  Fig 4b
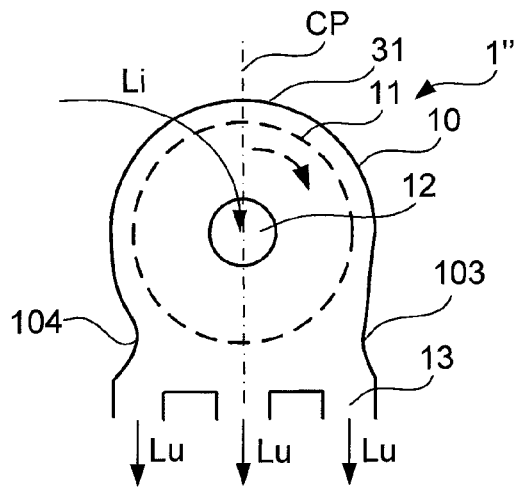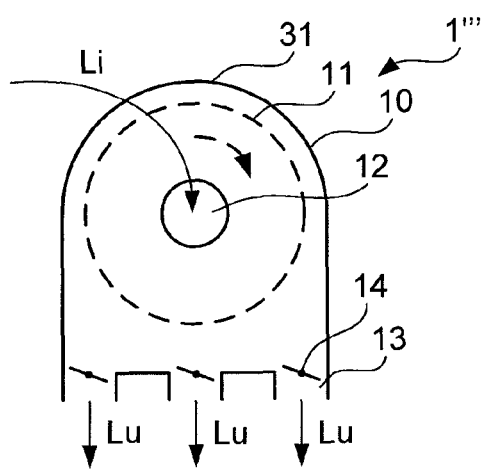
Fig 4c  Fig 4d

AGRICULTURAL IMPLEMENT HAVING A FEED DEVICE FOR AIRFLOW-BASED FEEDING OF A GRANULAR OR POWDER MATERIAL

TECHNICAL FIELD

This document relates to an agricultural implement which has a feed device for airflow-based feeding of a granular or powder material, such as seed, fertilizer or pesticide, to one or more applicators.

BACKGROUND

There are agricultural implements which use airflow to transport granular or powder material, such as seed, fertilizer or pesticide, from a feed device to one or more applicators, such as sowing shares or fertilizer shares.

Some agricultural implements of this kind use one or more fans of the centrifugal type in order to produce the airflow. A centrifugal fan normally comprises a fan housing, in which an impeller is rotatably disposed. By the radially central portion of the impeller, an inlet opening, through which air can be sucked in, is found in the fan housing. By the radially peripheral portion of the impeller, an outlet opening, through which air can be blown out, is found in the fan housing. The outlet opening is often directed substantially tangentially relative to the impeller.

The outlet opening can be connected to a tube or a pipe, which conducts air to, for example, a seed feeder.

The fan housing usually has a wall with curved inner surface, which, apart from the outlet opening, extends around the whole of the impeller so that the fan housing can be said to be "worm-shaped".

When a centrifugal fan is to be used to feed air to a plurality of consuming devices, branch pipes or Y-couplings connected to the outlet opening can be used to distribute the air from the outlet opening.

FIG. 1 shows an agricultural implement in the form of a sowing machine 200, which is pulled by a towing vehicle in the form of a tractor 300. The sowing machine 200 has a fan 201 for producing a feed airflow, an air duct 202 for conducting the feed airflow to a seed feeder 204, the function of which is to meter and to, using the airflow, feed seed via pipes or tubes 205 to sowing shares 206. The seed feeder 204 can be arranged below, or form a lower part of, a container (also referred to as "seed box") 203, so that the seed feeder 204 is filled with seed from the seed box 203 by the action of gravity.

In applications in which there is a limited supply of drive power, which can be the case with agricultural implements, it is desirable to improve the overall efficiency of the fan and its associated branch pipes or Y-couplings.

In applications to mobile units, such as agricultural implements, it is also desirable to minimize the spatial requirements by providing a fan and a branch arrangement which is as compact as possible.

SUMMARY

An object is thus to provide an agricultural implement which has an improved feed device for airflow-based feeding of a granular or powder material. Specific objects comprise providing a feed device which has improved efficiency and/or is more compact.

The invention is defined by the appended independent claims. Embodiments derive from the dependent claims, from the following description and from the drawings.

According to a first aspect, an agricultural implement, comprising at least one container for a granular or powder material and at least one feed device for airflow-based feeding of the granular or powder material, is provided. The feed device comprises a fan comprising an impeller accommodated in a fan housing. At least one wall portion of the fan housing is integrated with a wall portion of the container.

By "feed device" is meant devices which use airflow to, at least to some extent, feed granular or powder material. It will be appreciated that such devices can be used for feeding the material part of, or all of, its way from, for example, a container or metering stage to, for example, an applicator.

By "integrated" is meant that the wall portions are joined or formed in one piece. A wall portion of the container can thus be a wall portion of the fan housing.

By integrating at least one wall of the fan housing with the container, it is possible to provide a more compact agricultural implement and also an agricultural implement on which the fitting of pipes/tubes for the airflow-based feeding is facilitated.

A further advantage of integrating fan housing and container is that, since the seed box is often positioned high up on a sowing machine, the inlet of the fan is also positioned high up, which leads to a reduced risk of dust and other types of debris being drawn into the fan and causing damage to it or the feed device. This reduces also the risk of static electricity being formed (caused by dust and particulate debris) in the piping system and therewith associated build-up of flow impediments.

For example, an inlet wall of the fan housing can be integrated with an outer wall of the container.

In such an arrangement, the wall of the container can be a part of the fan housing.

A wall of the fan housing opposite to the inlet wall can be integrated with an inner wall of the container.

The fan housing can thus substantially be a space between an outer wall and an inner wall of the container.

The fan can be arranged such that the impeller is rotatable about a substantially horizontal axis, and wherein an outlet from the fan housing is directed substantially downwards.

The fan housing can have at least two outlets.

By "outlet" is meant a portion of the fan housing to which a duct in the form of a tube or a pipe can be coupled, and which is configured to conduct the majority of the air from the fan when this is in normal working mode.

By proving a fan housing having a plurality of outlets, it is possible to feed a plurality of feed devices with the aid of the same fan, without the need to use branch pipes or Y-couplings. This reduces the losses and increases the overall efficiency of the fan system.

The outlets can produce airflows in substantially the same plane.

By producing airflows directed in substantially the same plane out from the fan housing, a more even distribution of the airflows between the outlets is achieved.

According to one embodiment, the outlets can produce substantially parallel airflows.

The fan housing can comprise at least one guide wall, which can have at least one free end extending into the fan housing.

The fan housing can comprise at least one side wall portion which is inwardly convex.

The guide walls and the convex side wall portions can be used for conducting the airflows to the outlets, but also for optimizing the airflow at the impeller.

The fan housing can comprise at least one outlet actuator. The airflow to the respective outlets can be controlled with the outlet actuator.

The fan can be a fan of the centrifugal type.

The impeller can have backwardly inclined or backwardly curved blades.

The agricultural implement can comprise at least one of a sowing machine, a precision sowing machine, a fertilizer spreader and a pesticide spreader. For example, the agricultural implement can comprise a sowing machine or a precision sowing machine in combination with a fertilizer spreader and/or a pesticide spreader.

BRIEF DESCRIPTION OF THE DRAWINGS

FIGS. 4a-4d show schematic sectional views of variants of fans, viewed in a plane which is perpendicular to a rotational axis of the impeller.

DESCRIPTION OF EMBODIMENTS

Figure 1:
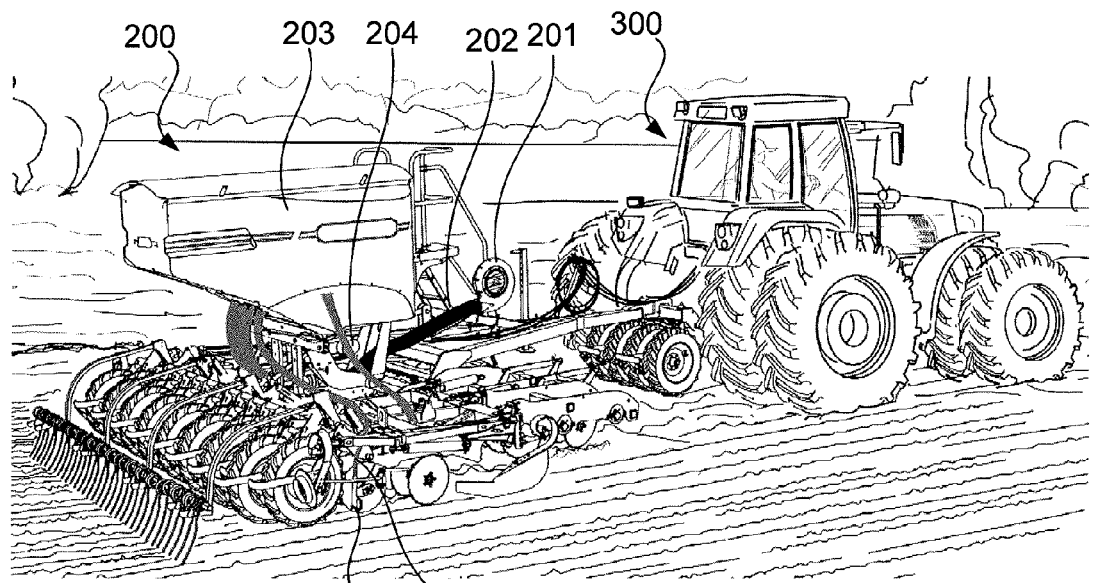
FIG. 1 shows an agricultural implement, in which a fan 1, 1', 1", 1''' according to this document can be used.
Figure 2:
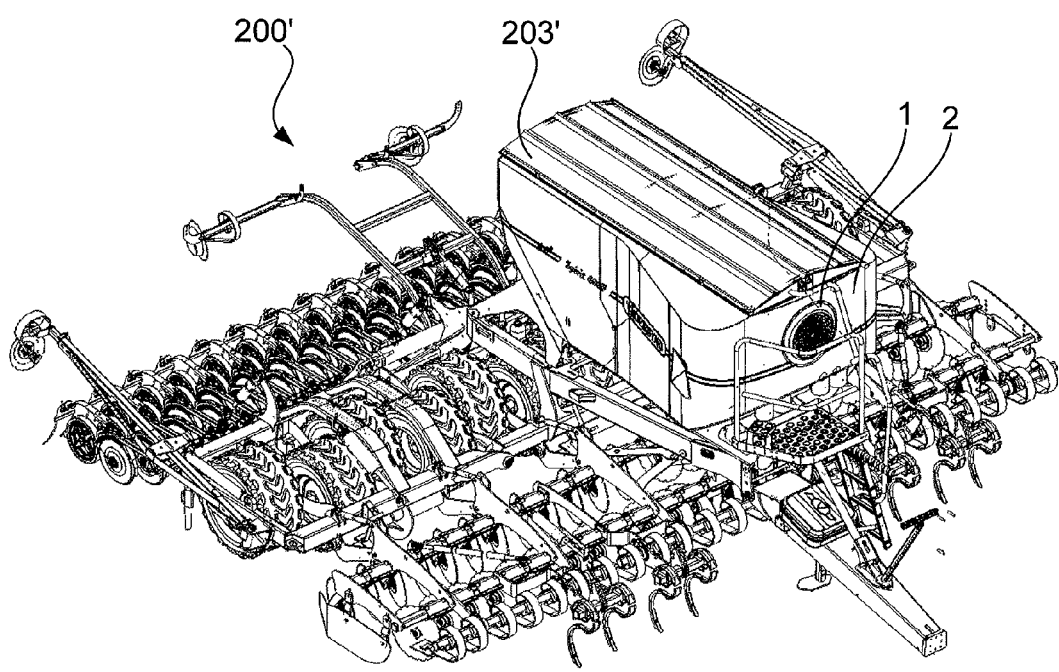
FIG. 2 shows a detailed view of the agricultural implement in FIG. 1.

FIG. 2 shows an agricultural implement 200' where a fan 1 has been integrated with a front wall 2 of a seed box 203'.

Figure 3A:
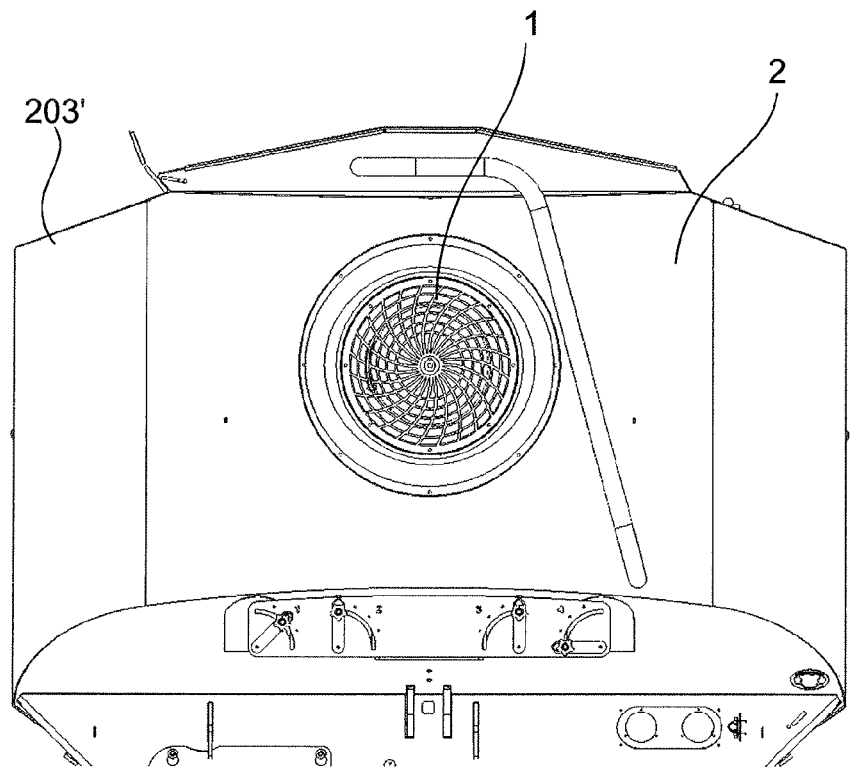
FIG. 3a shows a front view of a seed box 203' with an integrated fan.

FIG. 3a shows a front wall 2 of a seed box 203', which front wall also forms an inlet wall of the fan 1. The lower part of the fan can be situated at least 1.5 m above ground level, preferably at least 2 m above ground level or at least 2.5 m above ground level.

Figure 3B:
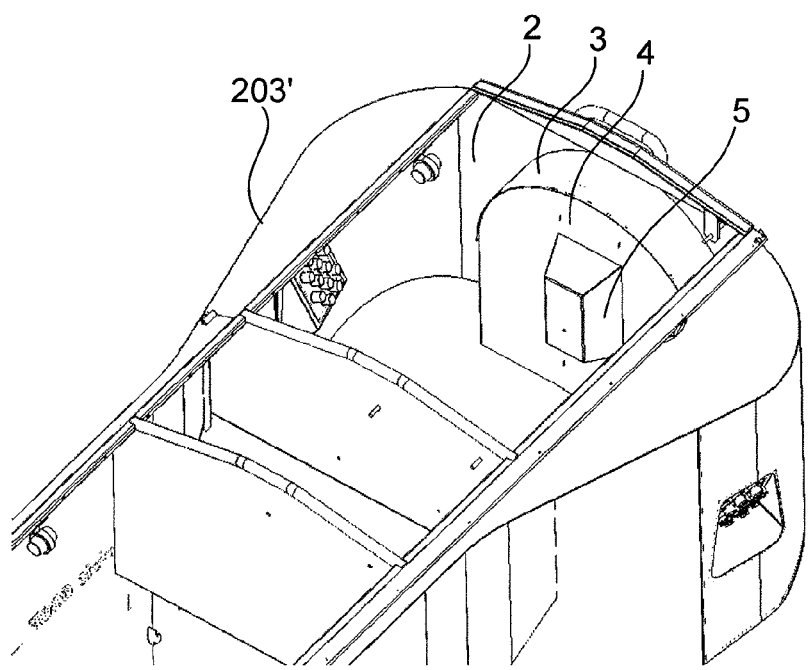
FIG. 3b shows a perspective view of the seed box 203', viewed obliquely from behind/above.

FIG. 3b shows how the fan housing extends into the seed box 203'. The fan housing has here a side wall 31, 32, 33, which can be curved as will be described in more detail further below, and a motor wall 4, which is provided with a motor compartment 5. The side wall 31, 32, 33 and the motor wall 4 form inner walls of the seed box 203'.

Figure 3C:
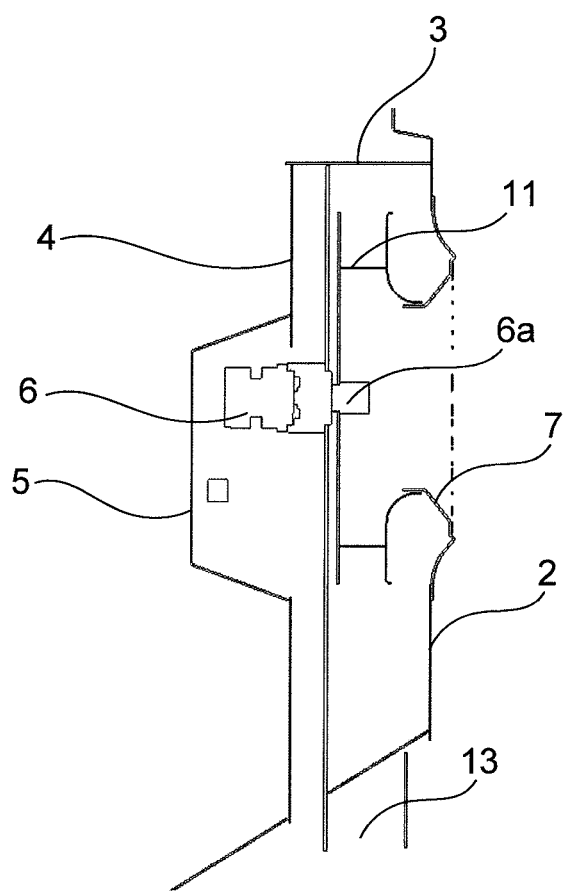
FIG. 3c shows a cross-sectional view of a fan housing, viewed in the transverse direction of the agricultural implement.

FIG. 3c shows the fan housing viewed in a longitudinal vertical cross-section. A drive unit 6, which will be described in more detail further below, is arranged in the motor compartment 5. Furthermore, an impeller 11 is rotatably mounted on a shaft 6a extending from the drive unit. An outlet 13 is directed downwards.

FIG. 4a shows schematically a fan 1 with a fan housing 10, an impeller 11, an inlet 12 and three outlets 13. The fan is of the centrifugal type, and is arranged to draw in air through the inlet 12 and blow out air through the air outlets 13. The fan housing has a side wall 31, 32, 33, comprising, viewed in a plane perpendicular to a rotational axis of the impeller, an upper curved, inwardly convex portion 31, which can extend over a central angle about the rotational axis of the impeller amounting to at least 180°. A radial distance between the side wall portion 31 and the periphery of the impeller can be constant or increasing in the rotational direction of the fan. The side wall 3 further has a pair of substantially straight portions 32, 33, which connect to the respective ends of the curved portion 31.

The impeller 11 can be directly or indirectly connected (via, for example, a belt, chain or shaft) connected to a drive source 6 (FIG. 3c), which can be an electrical motor or a drive unit which is driven with the aid of compressed air or hydraulic fluid, for example from a towing vehicle. The impeller 11 can be rotatable in the direction indicated by the dashed arrow.

The impeller 11 can have blades (not shown) of, viewed in the rotational direction of the impeller, the backwardly curved or backwardly inclined type; forwardly curved or forwardly inclined type; airfoil type; radial type or forwardly inclined/forwardly curved type with radially, backwardly curved or backwardly inclined outer portion.

During operation of the impeller 11, the three outlets 13 can produce outlet flows Lu which lie in substantially the same plane. The outlet flows Lu can be substantially parallel. In the illustrated example, the outlet flows are directed substantially downwards.

FIG. 4b shows a first variant of a fan 1'. In FIG. 4b, a vertical, central vertical plane CP is indicated, in which the geometrical rotational axis of the impeller is situated. The fan housing has been provided with inner guide walls 101, 102, which, viewed in said plane which is perpendicular to a rotational axis of the impeller, extend from side wall portions 31, 32 situated on respective sides of the central plane CP and in towards the central plane CP. A first guide wall 101 can extend farther in towards the central plane CP than a second guide wall 102. The guide walls 101, 102 can, but do not necessarily have to, connect to the side walls 31, 32, 33 of the fan housing. Thus, at least one of the guide walls can have at least one free end extending into the fan housing.

The first guide wall 101 can be concave inwards towards the impeller 11, viewed in a plane perpendicular to the rotational axis the fan. A radial distance between the first guide wall 101 and the periphery of the impeller 11 can be constant, decreasing or increasing in the direction towards the central plane CP. In particular, the distance between the guide wall 101 and the periphery of the impeller 11 can be increasing in the rotational direction the impeller 11.

The second guide wall 102 can be concave inwards towards the impeller 11, viewed in a plane perpendicular to the rotational axis of the fan. A radial distance between the second guide wall 102 and the periphery of the impeller 11 can be constant, decreasing or increasing in the direction towards the central plane CP. In particular, the distance between the guide wall 102 and the periphery of the impeller 11 can be increasing in the rotational direction of the impeller 11.

The guide walls 101, 102 can be used to control the flow in the fan housing, for example in order to achieve an even distribution between the outlets 13. Alternatively, the guide walls 101, 102 can be used to set up an intentionally uneven distribution between the outlets, for example should it be desirable to use one or more outlets for feeding one type of material and one or more other outlets for feeding another type of material.

FIG. 4c shows a second variant of a fan 1". The fan housing has here been provided with a first inwardly convex side wall portion 103 and a second inwardly convex side wall portion 104, viewed in a plane perpendicular to the rotational axis of the fan. The first side wall portion can be located on a side of the central plane CP in which the tangential direction of the fan points substantially towards the outlets 13. The second side wall portion 104 can be located on a side of the central plane CP in which the tangential direction of the fan points away from the outlets.

The second side wall portion 104 can extend farther in towards the central plane CP than the first side wall portion 103.

The side wall portions 103, 104 too can be used to control the airflow between various outlets 13 and to control the air velocity at various points along the periphery of the impeller. In this respect, it is often desirable to achieve an air velocity amounting to around 5-10 m/s, preferably around 6 m/s. This can be realized configuration of the side wall portion 31, possibly with the addition of convex side wall portions 103, 104 and/or guide walls 101, 102. Typically, a radial distance between the periphery of the impeller and the side wall/side wall portion 31, 101, 102, 103, 104 can be increasing in the rotational direction of the fan.

The embodiment according to FIG. 4c, having one or more inwardly convex side wall portions 103, 104, can be combined with one or more guide walls according to the embodiment in FIG. 4b.

FIG. 4d shows a third variant of a fan 1'''. The air outlets 13 have here been provided with actuators 14, which can be used to shut off or adjust the flow Lu in the respective outlets 13. The actuator can be constituted by a damper, valve or the like.

The embodiment according to FIG. 4d can be combined with the embodiments described with reference to FIG. 4b and/or FIG. 4c.

It will be appreciated that the fan housing can have a wall portion which is integrated with another wall portion of the container, for example an inner wall, a side wall, a back wall, a lower wall or bottom, or an upper wall or a lid.

It will be appreciated that the inlet can be directed substantially horizontally, which thus can be the case when the inlet wall is integrated with a side wall of the container. Alternatively, it can be advantageous to integrate the inlet wall with an upper wall or a lid of the container, wherein the inlet will be directed substantially vertically upwards.

It will also be appreciated that the outlet or outlets can be directed in other directions, for example substantially horizontally, substantially upwards, obliquely upwards or obliquely downwards.

The invention claimed is:

1. An agricultural implement configured to be pulled or supported by a towing vehicle, comprising:
  at least one container for granular or powder material; and
  at least one feed device for airflow-based feeding of the granular or powder material,
  wherein the at least one feed device comprises a fan, comprising an impeller accommodated in a fan housing,
  wherein an inlet wall of the fan housing is integrated with an outer wall of the at least one container, and
  wherein a wall of the fan housing opposite to the inlet wall is integrated with an inner wall of the at least one container.

2. An agricultural implement according to claim 1, wherein the fan is configured such that the impeller is rotatable about a substantially horizontal axis, and wherein an outlet from the fan housing is directed substantially downwards.

3. An agricultural implement according to claim 1, wherein the fan housing includes at least two outlets, which are arranged to produce an airflow to a respective feeder for the granular or powder material.

4. An agricultural implement according to claim 3, wherein the outlets produce airflows in substantially a same plane.

5. An agricultural implement according to claim 3, wherein the outlets produce substantially parallel airflows.

6. An agricultural implement according to claim 1, wherein the fan housing comprises at least one guide wall, which, viewed in a plane which is perpendicular to a rotational axis of the impeller, includes at least one free end extending into the fan housing towards a central plane.

7. An agricultural implement according to claim 1, wherein the fan housing comprises at least one, viewed in a plane perpendicular to the rotational axis of the fan, inwardly convex side wall portion.

8. An agricultural implement according to claim 1, further comprising at least one damper or valve for shutting off or adjusting a flow in respective outlets.

9. An agricultural implement according to claim 1, wherein the fan is of centrifugal type.

10. An agricultural implement according claim 9, wherein the impeller includes, viewed in the rotational direction of the impeller, backwardly inclined or backwardly curved blades.

11. An agricultural implement according to claim 1, wherein the agricultural implement comprises at least one of a sowing machine, a precision sowing machine, a fertilizer spreader, or a pesticide spreader.

* * * * *